United States Patent [19]

Gurley et al.

[11] Patent Number: 5,115,316
[45] Date of Patent: May 19, 1992

[54] FIELD SERVICE SWITCH FOR A TELEVISION RECEIVER

[75] Inventors: Thomas D. Gurley; Gene K. Sendelweck, both of Indianapolis, Ind.

[73] Assignee: Thomson Consumer Electronics Inc.

[21] Appl. No.: 694,974

[22] Filed: May 3, 1991

[51] Int. Cl.$^5$ .................. H04N 5/44; H04N 17/00
[52] U.S. Cl. ..................... 358/188; 358/10; 358/139; 358/160
[58] Field of Search ........... 358/188, 191.1, 194.1, 358/193.1, 139, 10, 34, 39, 160

[56] References Cited

U.S. PATENT DOCUMENTS

| | | | |
|---|---|---|---|
| 3,959,811 | 5/1976 | Shanley | 358/10 |
| 4,626,892 | 12/1986 | Northrup | 358/188 |
| 4,769,703 | 9/1988 | Osborne | 358/139 |
| 4,907,082 | 3/1990 | Richards | 358/188 |
| 4,914,516 | 4/1990 | Duffield | 358/188 |

Primary Examiner—Victor R. Kostak
Assistant Examiner—Sherrie Hsia

[57] ABSTRACT

A television receiver provides a noise-free set up signal by automatically selecting an unused baseband video input terminal, or an unused pair of SVIDEO input terminals. Selection of the unused terminals provides a D.C. level to the luminance path, and allows the horizontal oscillator to free-run. In addition to selecting an unused video input terminal, the subject apparatus automatically increases the brightness level a few steps to simulate a 7.5 IRE flat field (commonly known as set up). The above-listed steps may be performed manually by a service technician, for television receivers not incorporating apparatus for automatically performing the steps.

1 Claim, 2 Drawing Sheets

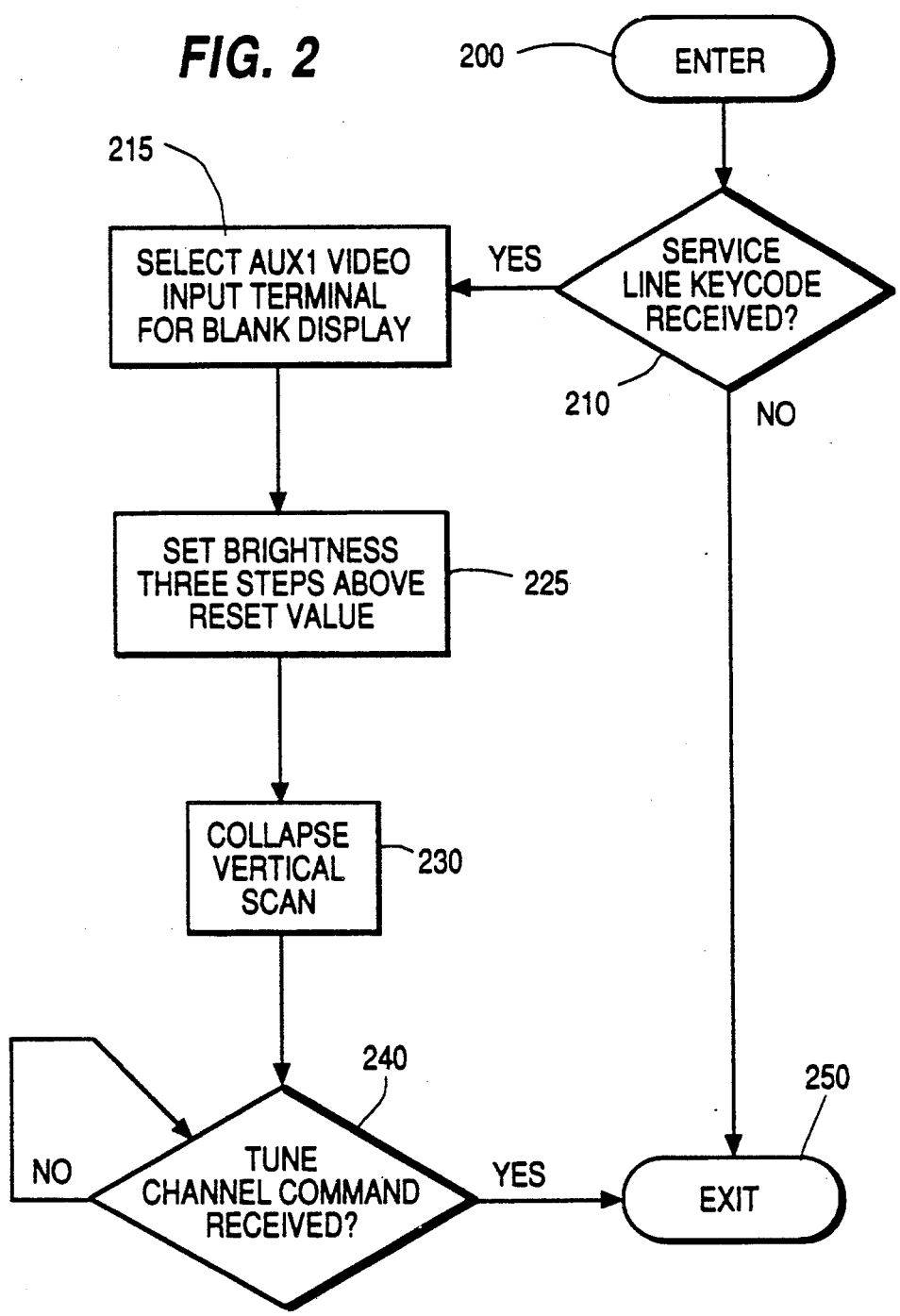

FIELD SERVICE SWITCH FOR A TELEVISION RECEIVER

FIELD OF THE INVENTION

The subject application generally concerns the field of television receivers and specifically concerns apparatus for providing a noise-free set-up signal.

BACKGROUND OF THE INVENTION

Field service repairs of color television receivers often require the picture tube to be rebiased. Biasing the picture tube is often referred to as setting up the tube. Typical repairs which require a set up include installing a new picture tube, a new signal processing integrated circuit, or a new output device. The initial set up for each receiver is performed in the manufacturing facility, and involves the use of automated test equipment designed specifically for the task. Television manufacturers generally provide some means for field service set up because field service technicians have no access to such specialized equipment.

The field service set up means, referred to above involves the use of a "service line", generated by collapsing the vertical scan to produce a display comprising one, or only a few, horizontal lines running across the approximate center of the picture screen. Defeating vertical scan is not sufficient, by itself, for producing a service line. Unless internal video signal processing is defeated, or unless a specific alternate video signal is provided, the video content of the line will cause undesirable intensity fluctuations of the service line. Ideally, the intensity of the service line should be constant and its color should be "white".

Prior set up arrangements employing a service

It is not very practical to require a specific video signal to be substituted for the normal video signal because the service technician might not have access to equipment for producing the required signal. A more practical approach involves defeating the video detector output of the intermediate frequency amplifier (IF amp), or attenuating the video signal by reducing the video gain by affecting the contrast control, or both.

Unfortunately, in many cases it is no longer possible to break the signal path at video detector output, because that point may be inside a very large scale integrated circuit (VLSI), and therfore be inaccessible. One may feel that the desired circuit point could be made accessible by bringing it out of the IC (integrated circuit) by way of a terminal pin. However, this approach is impractical because IC pins are thought of as a precious commodity, there never being enough of them.

SUMMARY OF THE INVENTION

Apparatus according to the subject invention provides a noise-free set up signal by automatically selecting an unused baseband video input terminal, or an unused pair of SVIDEO input terminals. Selection of the unused terminals provides a D.C. level to the luminance path, and allows the horizontal oscillator to free-run. In addition to selecting an unused video input terminal, the subject apparatus automatically increases the brightness level a few steps to simulate a 7.5 IRE flat field (commonly known as set up).

It is also recognized that the above-listed steps may be performed manually by a service technician, for television receivers not incorporating apparatus for automatically performing the steps.

BRIEF DESCRIPTION OF THE DRAWING

FIG. 2 is a flowchart showing a portion of the control program of the controller of FIG. 1.

DETAILED DESCRIPTION OF THE EMBODIMENT

Figure 1:
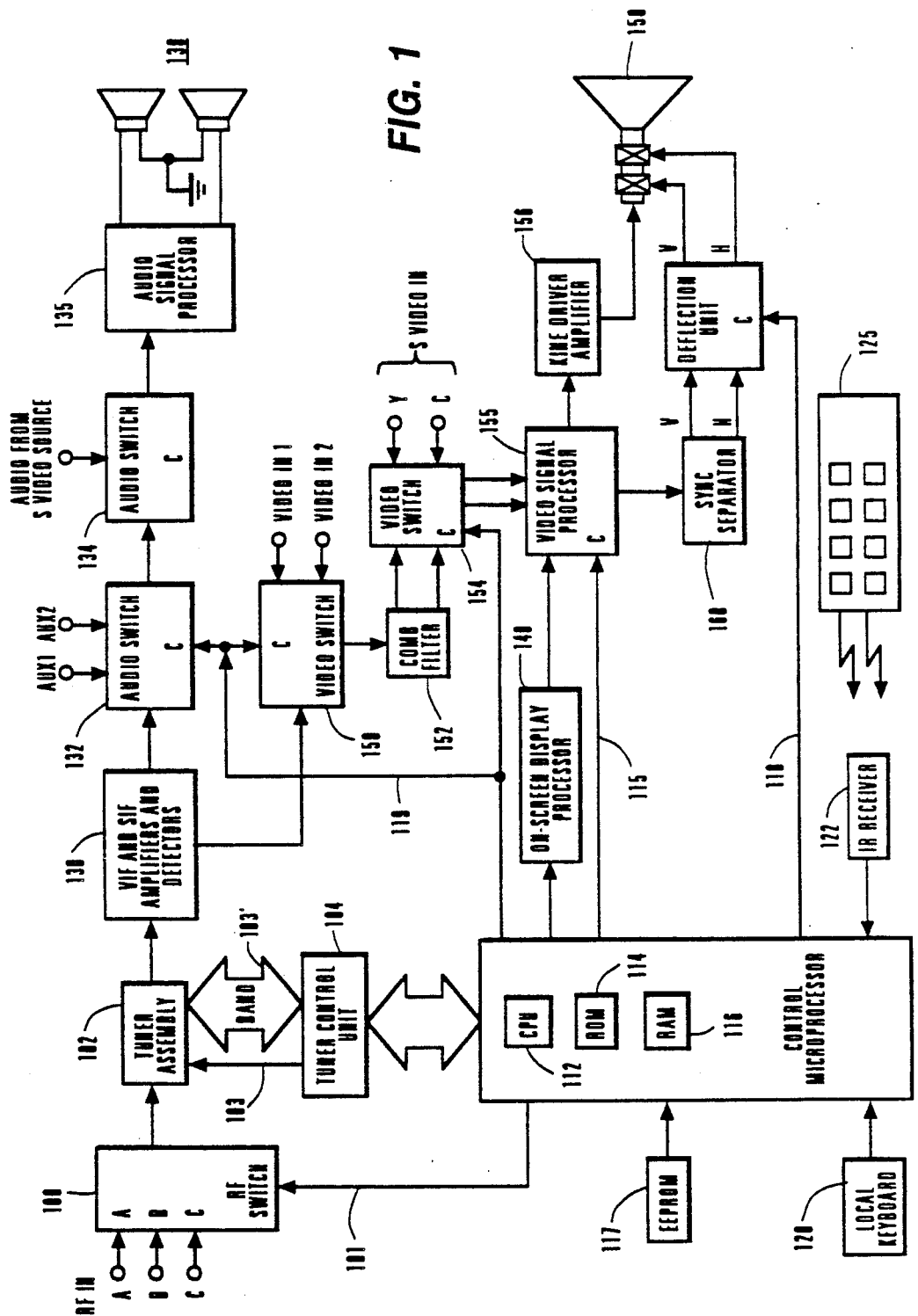
FIG. 1 shows, in block diagram form, a television receiver incorporating the subject invention.

Referring to FIG. 1, radio frequency (RF) signals are applied to RF input terminals A, B, and C of RF switch 100. Under control of a control signal applied via wire 101, RF switch 100 selects one of inputs A, B, and C to supply one or more RF signals to a tuner assembly 102. Tuner assembly 102 selects a particular RF signal under control of a tuner control unit 104 which applies a tuning control signal to tuner assembly 102 via a wire 103, and applied bandswitching signals via a control bus 103'. Tuner control unit 104 is controlled by a controller 110. Controller 110, which may be a microprocessor or microcomputer, includes a central processing unit (CPU) 112, a read-only memory (ROM) 114, and a random access memory 116, and an electrically-erasable programmable read only memory (EEPROM) 117. Controller 110 generates the above-mentioned control signal for RF switch 100 for selecting an RF input for tuner 102. Controller 110 receives user-entered control signals from a local keyboard 120 and from an infrared (IR) receiver 122. IR receiver 122 receives and decodes remote control signals transmitted by a remote control unit 125.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a baseband composite video signal (TV), and a sound carrier signal. The sound carrier signal is applied, via a first audio switch unit 132 and a second audio switch unit 134, to an audio signal processor unit 135 which includes an audio detector and a stereo decoder. Audio switch unit 132 includes AUX1 and AUX2 auxiliary audio input terminals. While terminals AUX1 and AUX2 are shown for simplicity as single wire terminals, they may be stereo audio input terminals, and audio switch 132 may be a stereo audio switch. Audio switch unit 134 includes a terminal for receiving audio from an SVIDEO source. Audio signal processor unit 135 produces baseband left and right audio signals and applies them to a pair of speakers 138 for sound reproduction.

The baseband video signal (TV) is coupled, via a video switch unit 150, to a comb filter unit 152. Comb filer unit 152 separate the video signal into its luminance (Y) and chrominance (C) components, which are applied to inputs of a second video switch unit 154. Second video switch unit 154 has inputs for receiving luminance (Y) and chrominance (C) components of an SVIDEO signal. The output signals of video switch unit 154 are applied to a video processor unit 155 and a kine driver amplifier 156, and are ultimately displayed on a display screen of a display device 158. Video switch unit 150 includes VIDEO IN1 and VIDEO IN2 auxiliary baseband video input terminals. Video signals are also applied to a sync separator unit 160 which derives vertical and horizontal synchronizing signals therefrom. The derived vertical and horizontal signals are applied to a deflection unit 170 for the production of deflections signals for application to the yoke assembly of display device 158. Under control of controller 110, an on-screen display processor 140 generates character signals, and applies them to a second input of video signal processor 155, for display on display device 158. Controller 110 controls the switching of audio switch units 132 and 134, and video switch units 150 and 154 via a control line 119. The circuitry described thus far is known from the above-mentioned RCA CTC-140 color television chassis.

The subject invention will now be described with further reference to FIG. 1, and with reference to FIG. 2.

The set up mode is a service mode intended for use by qualified service technicians. As such, manufacturers restrict user access to this mode in some fashion. In Osborne U.S. Pat. No. 4,769,703 the service mode is entered by pressing a designated key of the local keyboard of the television receiver, while plugging the receiver into a source of AC power. This procedure is considered to be an acceptable method, suitable for use with the subject invention. However, the subject apparatus prevents accidental access by a user to the set up mode by requiring the pressing of a unique combination of keys.

Before entering the specific set up keycode combination, the service technician disconnects any auxiliary video signal source which may be connected to the AUX 1 video input terminal. Referring to FIG. 2, control microprocessor 110 performs an enters of the routine (step 200), and then advances to step 210 wherein it checks to see if the proper code for invoking the set up mode is being entered. If not, the routine is exited at step 250 so that the receiver can function normally. If, at step 210, the proper code for entering the set up mode was being entered, then the YES path is taken to step 215. At step 215, the unused AUX 1 video input terminal is selected in order to produce a blank display. The selection is accomplished by controller 110 controlling video switch 154 via a control line 119. The routine then advances to step 225 wherein video signal processor is controlled, via a control line 115, to increase the brightness a few steps above the factory preset value to simulate a 7.5 IRE flat field. The routine then advances to step 230 wherein deflection unit 170 is controlled, via a control line 118, to collapse vertical scan. At this point the routine advances to step 240 and waits for a channel change command. Step 240 causes the television receiver to remain in the service mode for as long as necessary for the service technician to adjust the color temperature of the television receiver with the adjustable screen bias controls. When the service technician is finished, he enters a channel change command which is detected at step 240, and causes to routine to follow the YES path to the exit at step 250.

When the vertical scan is collapsed, the image display field is reduced to a narrow horizontal line comprising one or only a few horizontal scan lines. As noted above, the unused video input terminal provides a D.C. signal which is applied to the luminance path. This D.C. signal is substantially noise-free, and has the same effect as applying a 0 IRE level flat field signal to the luminance path. In this mode the horizontal oscillator is free running, and the black level clamp (not shown) of video signal processor 155 is at its quiescent operating point.

The AUX 1 video input is herein described as the unused input to be selected in set up mode. However, selecting the unused SVIDEO input is also acceptable for purposes of the invention. In the above-described embodiment, the selection of the unused video input, and the adjustment of the brightness level were described as being performed automatically. However, it television receivers which do not incorporate apparatus for automatically accomplishing those steps, it is envisioned that they may be performed manually.

Thus, there has been described a set up procedure which does not require a special test signal to be applied to the television receiver, and provides a means to interrupt unwanted video signals from disturbing the brightness and contrast levels of the service line.

What is claimed is:

1. A television receiver, comprising:
a radio frequency (RF) signal input terminal for receiving a group of RF signals;
tuner means coupled to said RF signal input terminal for receiving said group of RF signals, said tuner means selecting a particular RF signal from said group of RF signals in response to a first control signal, and converting said particular RF signal to a signal at an intermediate frequency (IF);
first video processing means coupled to said tuner means for receiving, demodulating and amplifying said IF signal, and producing a detected video signal at an output; and
control means for generating said first control signal for causing said tuner means to select said particular RF signal;
means, coupled to said control means, for entering data in response to operation by a user;
memory means having a plurality of areas for storing data related to the tuning of preferred ones of said RF signals;
a video input terminal for receiving an auxiliary video signal;
switch means for selectively coupling its output terminal to one of said video input terminal and said output of said first video processing means;
second video processing means coupled to said output of said switch means for processing a signal supplied by said switch means, said second video processing means including brightness adjusting means having a control input; and
deflection means for producing horizontal and vertical deflection signals, said deflection means having a control input;
wherein in response to a detection of a code for invoking a set up mode, said control means automatically causes said switch means to select said video input terminal, controls said brightness adjusting means to adjust the brightness level to a predetermined value, and controls said deflection means to cease producing vertical scan signals.

* * * * *